United States Patent
You et al.

(10) Patent No.: US 9,967,778 B2
(45) Date of Patent: May 8, 2018

(54) RECEPTION METHOD OF MTC DEVICE

(71) Applicant: LG Electronics Inc., Seoul (KR)

(72) Inventors: Hyangsun You, Seoul (KR); Yunjung Yi, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 14/898,553

(22) PCT Filed: Jun. 11, 2014

(86) PCT No.: PCT/KR2014/005100
§ 371 (c)(1),
(2) Date: Dec. 15, 2015

(87) PCT Pub. No.: WO2014/204128
PCT Pub. Date: Dec. 24, 2014

(65) Prior Publication Data
US 2016/0127952 A1    May 5, 2016

Related U.S. Application Data

(60) Provisional application No. 61/954,623, filed on Mar. 18, 2014, provisional application No. 61/843,456, (Continued)

(51) Int. Cl.
*H04L 5/00* (2006.01)
*H04W 28/20* (2009.01)
(Continued)

(52) U.S. Cl.
CPC ........... *H04W 28/20* (2013.01); *H04W 4/005* (2013.01); *H04W 72/085* (2013.01);
(Continued)

(58) Field of Classification Search
None
See application file for complete search history.

(56) References Cited

U.S. PATENT DOCUMENTS

2011/0264740 A1    10/2011   Diachina et al.
2013/0083753 A1*   4/2013   Lee ................... H04W 72/0453
                                                                  370/329
(Continued)

OTHER PUBLICATIONS

International Search Report issued in corresponding International Patent Application No. PCT/KR2014/005100 dated Sep. 12, 2014.
(Continued)

*Primary Examiner* — Chi H Pham
*Assistant Examiner* — Soon-Dong D Hyun
(74) *Attorney, Agent, or Firm* — Morgan, Lewis & Bockius LLP

(57) ABSTRACT

The present specification provides a reception method of a machine type communication (MTC) device. The reception method can comprise the steps of: receiving a control channel through the entire system bandwidth on first and second orthogonal frequency division multiplexing (OFDM) symbols of a subframe; and determining whether to receive a data channel only in a reduced bandwidth compared with the system bandwidth from the third symbol of the subframe. At this point, when the control channel does not continue up until a third symbol of the subframe, the data channel can be received in a reduced bandwidth compared with the system bandwidth from the third symbol of the subframe.

16 Claims, 18 Drawing Sheets

Related U.S. Application Data filed on Jul. 8, 2013, provisional application No. 61/837,163, filed on Jun. 19, 2013.

(51) Int. Cl.

| | | |
|---|---|---|
| *H04W 4/00* | (2009.01) | |
| *H04W 72/08* | (2009.01) | |
| *H04W 74/00* | (2009.01) | |
| *H04W 72/00* | (2009.01) | |

(52) U.S. Cl.
CPC ......... *H04W 74/002* (2013.01); *H04L 5/0023* (2013.01); *H04L 5/0053* (2013.01); *H04W 72/00* (2013.01)

(56) References Cited

U.S. PATENT DOCUMENTS

| | | |
|---|---|---|
| 2013/0136098 A1 | 5/2013 | Li et al. |
| 2013/0195041 A1* | 8/2013 | Papasakellariou .. H04W 72/042 370/329 |
| 2013/0308572 A1* | 11/2013 | Sayana ............... H04W 72/048 370/329 |
| 2013/0315159 A1* | 11/2013 | Xia .................... H04W 72/042 370/329 |

OTHER PUBLICATIONS

Huawei, "E-UTRA Downlink L1/L2 control channel Mapping," R1-071105, 3GPP TSG RAN WG1 Meeting #48, St. Louis, USA, Feb. 12-16, 2007.

Huawei et al., "Considerations on the bandwidth reduction for low cost MTC UE," R1-113659, 3GPP TSG RAN WG1#67, San Francisco, USA, Nov. 14-18, 2011.

Vodafone, "Low cost & enhanced coverage MTC UE for LTE-Core Part," RP-130848, 3GPP TSG RAN meeting #60, Oranjestad, Aruba, Jun. 10-14, 2013.

* cited by examiner (b) MULTIPLE CCS (a) SINGLE CC (a)

(b)

RECEPTION METHOD OF MTC DEVICE

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

However, the MTC device must be able to be manufactured with a low unit cost to achieve a high distribution rate. As one method of decreasing a manufacturing unit cost, communication performance of the MTC device may be decreased to be lower than that required in LTE/LTE-A. As one exemplary method for decreasing the communication performance, a bandwidth may be reduced to be lower than that supported by the normal UE for LTE/LTE-A.

However, transmission/reception based on LTE/LTE-A may not be smoothly performed if the bandwidth is reduced as described above.

SUMMARY OF THE INVENTION

Accordingly, the disclosure of the specification has been made in an effort to solve the problem.

In order to achieve the aforementioned purpose, the present specification provides a reception method in a machine type communication (MTC) device. The method may comprise: receiving a control channel through an entire system bandwidth on first and second orthogonal frequency division multiplexing (OFDM) symbols of a subframe; and determining whether to receive a data channel only at a reduced bandwidth in comparison with the system bandwidth from a third symbol of the subframe. If the control channel is not continued up until the third symbol of the subframe, the data channel may be received on the reduced bandwidth in comparison with the system bandwidth from the third symbol of the subframe.

If the control channel is continued up until the third symbol of the subframe, the control channel may be received up until the third symbol through the entire system bandwidth without having to reduce the bandwidth.

The determining may be performed when information regarding the number of OFDM symbols in which the control channel exists is not received.

In the receiving of the control channel, a reference signal may be detected by decoding the entire system bandwidth on the first and second OFDM symbols.

When the data channel is received on a bandwidth reduced in comparison with the system bandwidth from the third symbol, the reference signal may be detected by decoding only the reduced bandwidth.

For a channel state information (CSI) report, a measurement may be performed by decoding an additional band other than a bandwidth at which the data channel is received.

The method may further comprise: receiving information regarding the additional band.

The additional band may be separated by a specific offset from the bandwidth at which the data channel is received, or is adjacent to both sides or one side thereof.

The method may further comprise: feeding back to a base station a channel quality indicator (CQI) for a specific number of sub-bands exhibiting the best performance among bandwidths at which the data channel is received.

In order to achieve the aforementioned purpose, the present specification provides a machine type communication (MTC) device. The MTC device may comprise: a transceiver; and a controller for controlling the transceiver, for receiving a control channel through an entire system bandwidth on first and second orthogonal frequency division multiplexing (OFDM) symbols of a subframe, and for determining whether to receive a data channel only at a reduced bandwidth in comparison with the system bandwidth from a third symbol of the subframe. If the control channel is not continued up until the third symbol of the subframe, the controller may control the transceiver to receive the data channel on the reduced bandwidth in comparison with the system bandwidth from the third symbol of the subframe.

According to the disclosure of the specification, the problem in the related art is solved.

DESCRIPTION OF EXEMPLARY EMBODIMENTS

Figure 1:
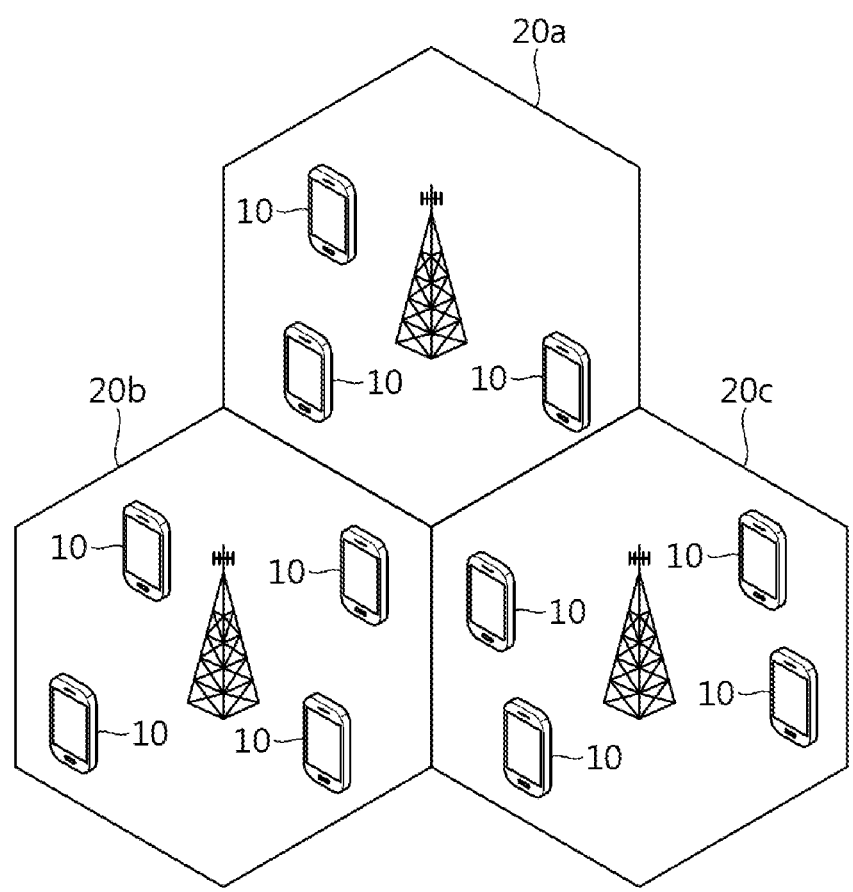
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to differentiate one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Shows a Wireless Communication System.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
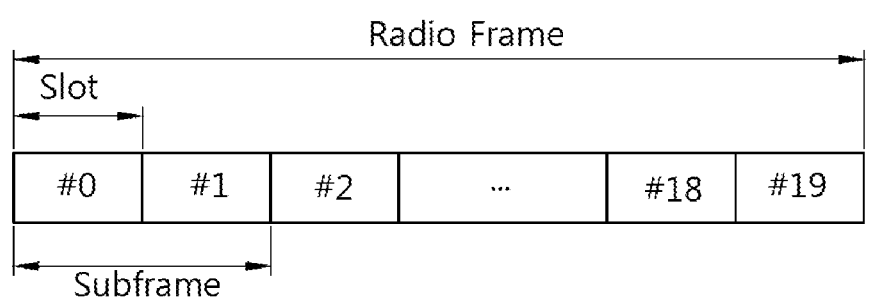
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
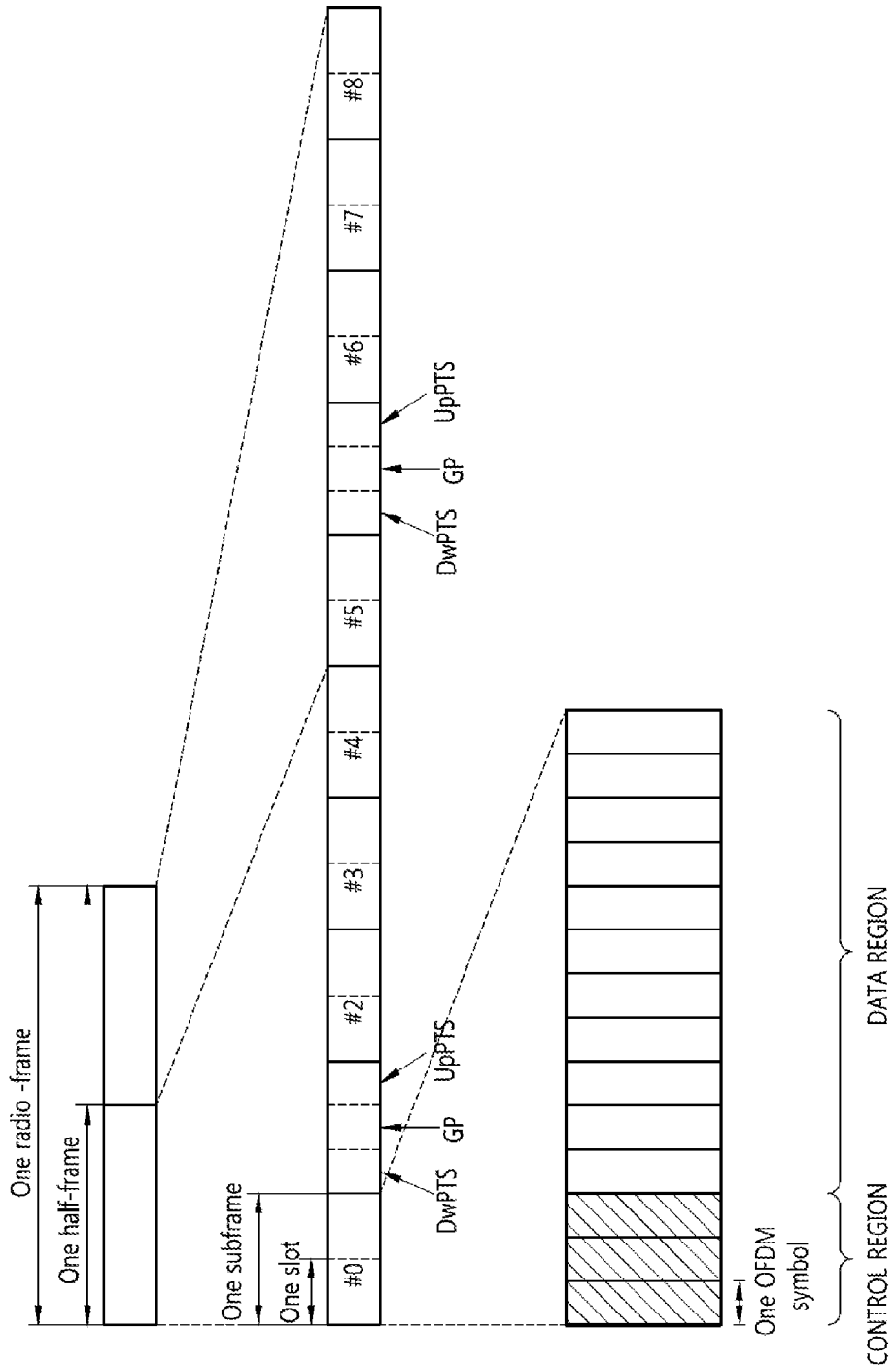
FIG. 3 illustrates the architecture of a downlink radio frame according to time division duplex (TDD) in 3GPP LTE.

FIG. 3 Shows an Example of a Resource Grid for One Uplink or Downlink Slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configu-raiton | Switch-point pe-riodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
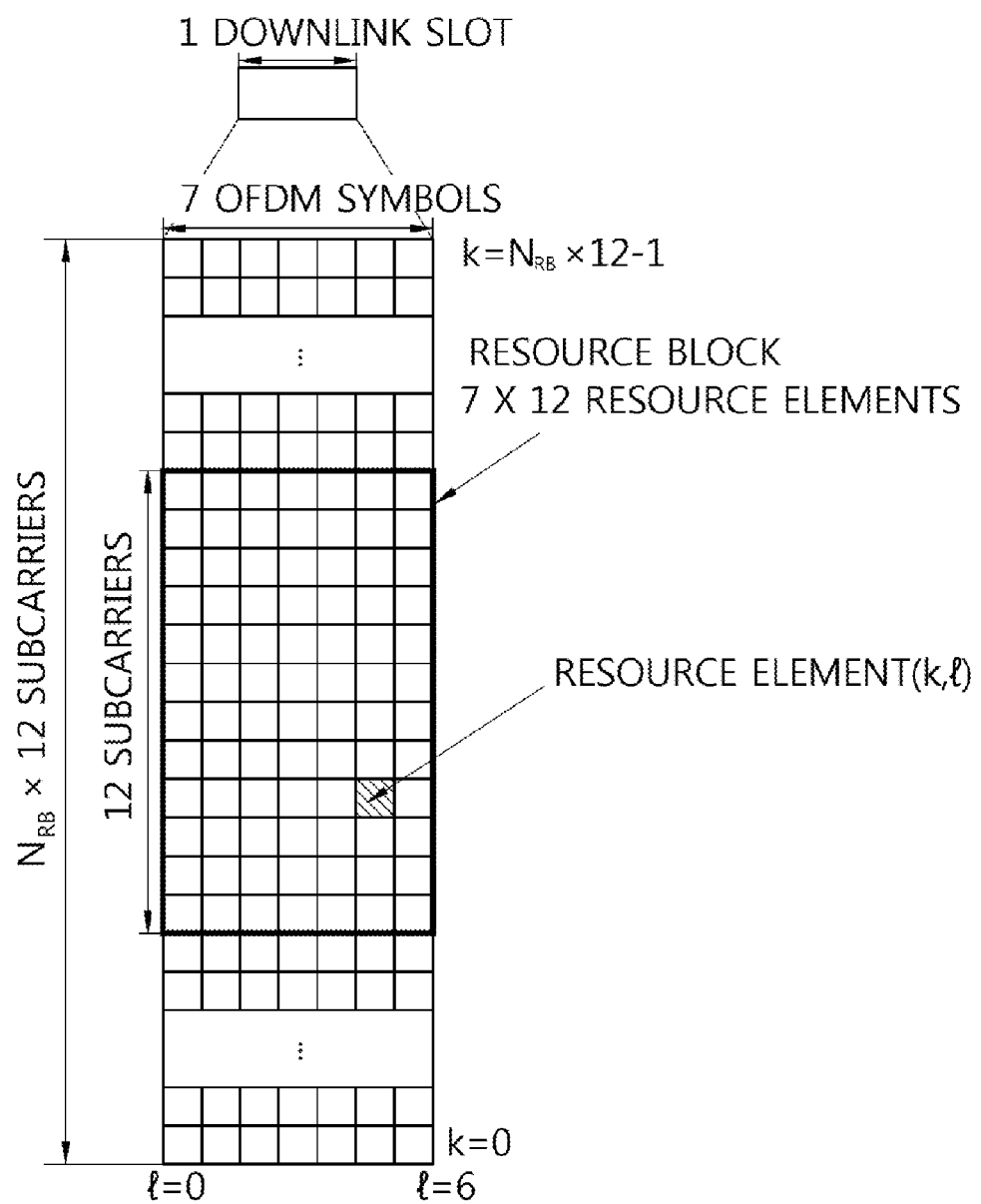
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
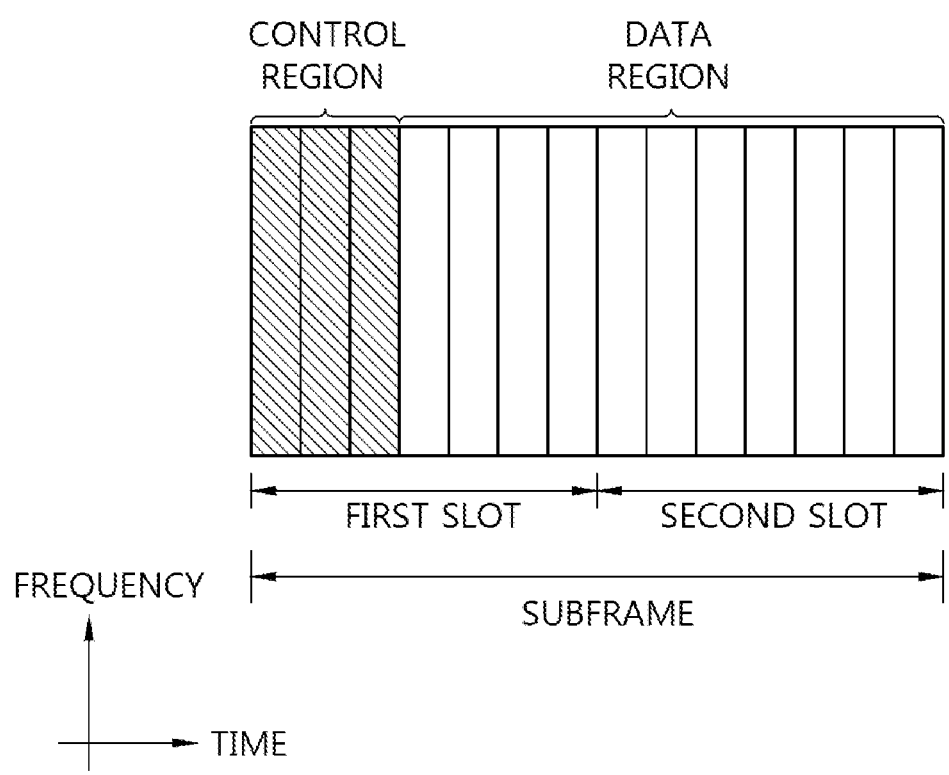
FIG. 5 illustrates the architecture of a downlink subframe.

FIG. 5 Illustrates the Architecture of a Downlink Sub-Frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

A usage of the DCI format is classified as shown in the following table.

TABLE 3

| DCI format | Contents |
| --- | --- |
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

TABLE 2

| Transmission mode | DCI format | Search space | Transmission mode of PDSCH according to PDCCH |
| --- | --- | --- | --- |
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmission diversity |
| | DCI format 1 | UE-specific | Transmission diversity |
| Mode 3 | DCI format 1A | Common and UE-specific | Transmission diversity |
| | DCI format 2A | UE-specific | CDD (Cyclic Delay Diversity) or Transmission diversity |
| Mode 4 | DCI format 1A | Common and UE-specific | Transmission diversity |
| | DCI format 2 | UE-specific | Closed-loop spatial multiplexing |
| Mode 5 | DCI format 1A | Common and UE-specific | Transmission diversity |
| | DCI format 1D | UE-specific | MU-MIMO(Multi-user Multiple Input Multiple Output) |
| Mode 6 | DCI format 1A | Common and UE-specific | Transmission diversity |
| | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
| | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
| | DCI format 2B | UE-specific | Dual layer transmission (port 7 or 8), or single antenna port, port 7 or 8 |

Figure 6:
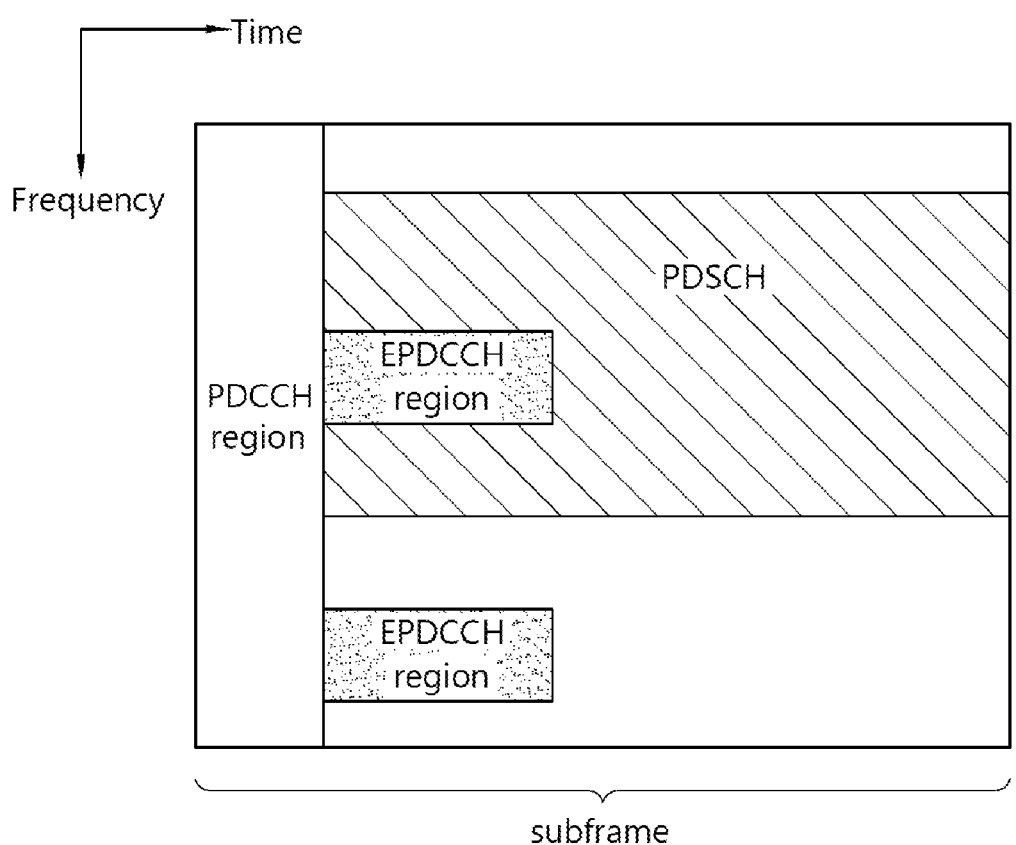
FIG. 6 illustrates a subframe having an enhanced physical downlink control channel (EPDCCH).

FIG. 6 Illustrates a Subframe Having an EPDCCH.

A subframe may include a zero or one PDCCH region or zero or more EPDCCH regions.

The EPDCCH regions are regions in which a wireless device monitors an EPDCCH. The PDCCH region is located in up to four front OFDM symbols of a subframe, while the EPDCCH regions may flexibly be scheduled in OFDM symbols after the PDCCH region.

One or more EPDCCH regions may be designated for the wireless device, and the wireless devices may monitor an EPDCCH in the designated EPDCCH regions.

The number/location/size of the EPDCCH regions and/or information on a subframe for monitoring an EPDCCH may be provided by a base station to a wireless device through an RRC message or the like.

In the PDCCH region, a PDCCH may be demodulated based on a CRS. In the EPDCCH regions, a demodulation (DM) RS may be defined, instead of a CRS, for demodulation of an EPDCCH. An associated DM RS may be transmitted in the corresponding EPDCCH regions.

The respective EPDCCH regions may be used for scheduling of different cells. For example, an EPDCCH in the EPDCCH region may carry scheduling information for a primary cell, and an EPDCCH in the EPDCCH region may carry scheduling information for a secondary cell.

When an EPDCCH is transmitted through multiple antennas in the EPDCCH regions, the same precoding as that for the EPDCCH may be applied to a DM RS in the EPDCCH regions.

A PDCCH uses a CCE as a transmission resource unit, and a transmission resource unit for an EPDCCH is referred to as an enhanced control channel element (ECCE). An aggregation level may be defined as a resource unit for monitoring an EPDCCH. For example, when 1 ECCE is a minimum resource for an EPDCCH, an aggregation level may be defined as $L=\{1, 2, 4, 8, 16\}$.

As illustrated, it is characterized that the EPDCCH is transmitted in the existing PDSCH region, and can obtain a beamforming gain and a spatial diversity gain according to a transmission type. Further, since the EPDCCH transmits control information, higher reliability than data transmission is required, and to satisfy this, the concept of an aggregation level or the like is used to decrease a coding rate. Since a high aggregation level can decrease the coding rate, it is possible to increase demodulation accuracy. However, there is a disadvantage in that performance is decreased due to an increase in resources in use.

Figure 7:
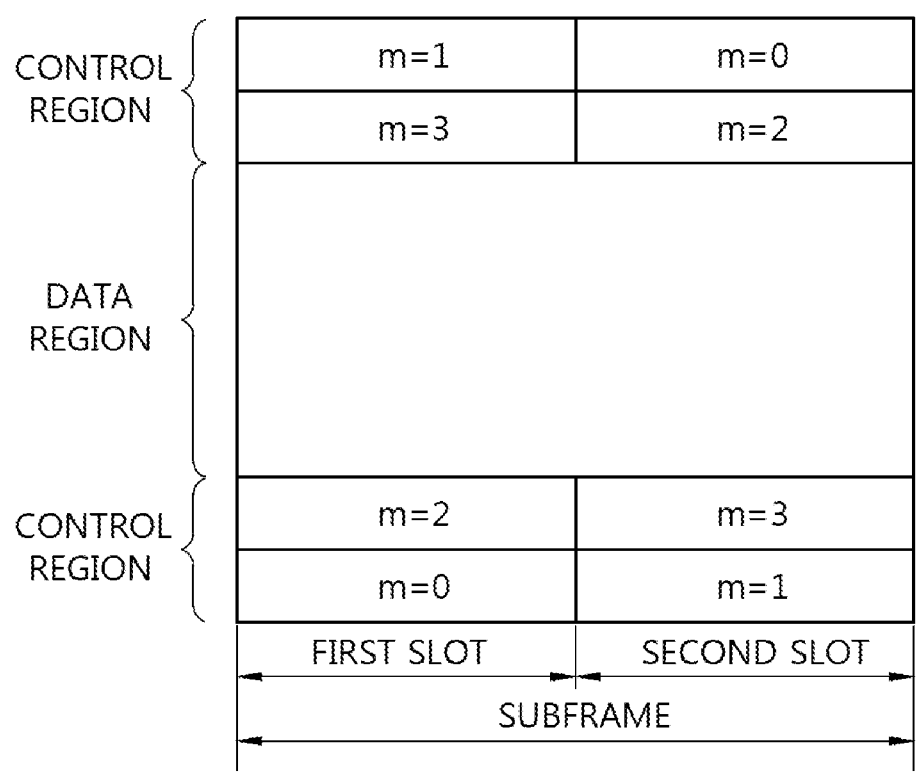
FIG. 7 illustrates the architecture of an uplink subframe in 3GPP LTE.

FIG. 7 Illustrates the Architecture of an Uplink Sub-Frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 8:
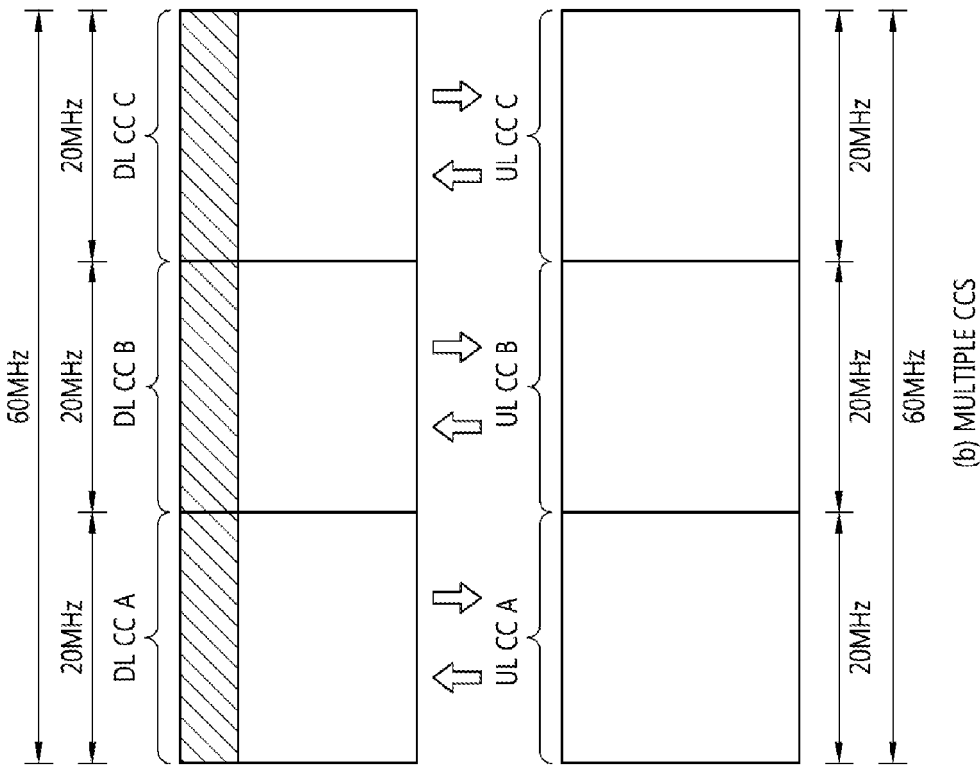
FIG. 8 illustrates an example of comparison between a single carrier system and a carrier aggregation system.
Figure 8:
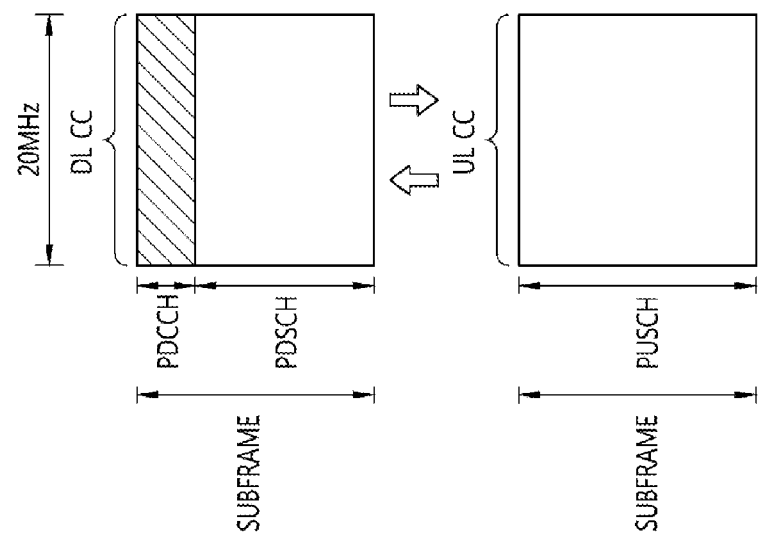

FIG. 8 Illustrates an Example of Comparison Between a Single Carrier System and a Carrier Aggregation System.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
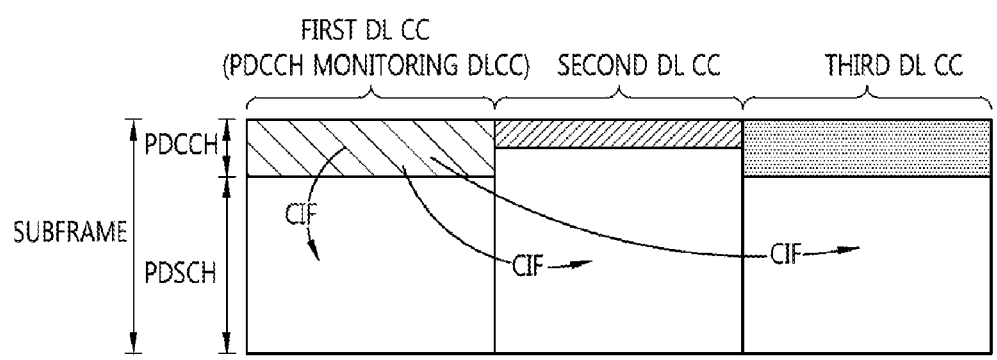
FIG. 9 exemplifies cross-carrier scheduling in a carrier aggregation system.

FIG. 9 Exemplifies Cross-Carrier Scheduling in the Carrier Aggregation System.

Referring to FIG. 9, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 9 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, various reference signals (RSs) are transmitted in a subframe.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink reference signal (RS) can be classified into a cell-specific RS (CRS), a Multimedia Broadcast and multicast Single Frequency Network (MBSFN) RS, a UE-specific RS (URS), a positioning RS (PRS), and a channel state information (CSI) RS (CSI-RS). The CRS is an RS transmitted to all UEs in a cell. The CRS can be used in channel measurement for a CQI feedback and in channel estimation for a PDSCH. The MBSFN RS can be transmitted in a subframe allocated for MBSFN transmission. The URS is an RS received by a specific UE or a specific UE group in the cell, and can also be called a demodulation RS (DM-RS). The DM-RS is primarily used in data demodulation of a specific UE or a specific UE group. The PRS may be used for location estimation of the UE. The CSI-RS is used in channel estimation for a PDSCH of an LTE-A UE. The CRI-RS is relatively sparsely arranged in a frequency domain or a time domain. The CSI-RS can be punctured in a data region of a normal subframe or an MBSFN subframe.

Figure 10:
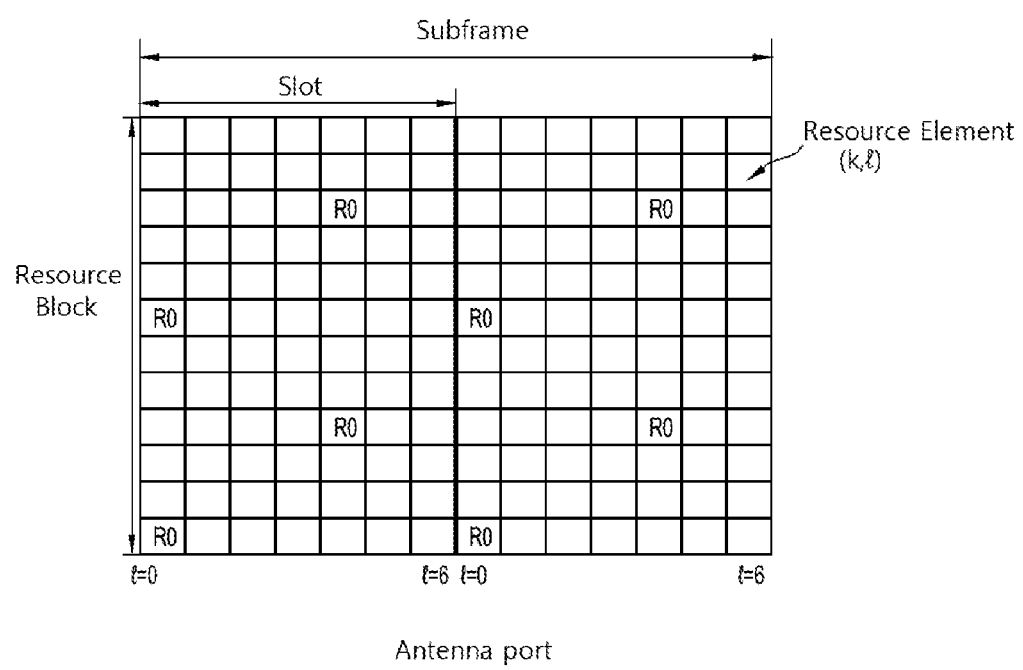
FIG. 10 shows an example of a pattern in which a cell-specific reference signal (CRS) is mapped to a resource block (RB) when a base station uses one antenna port.

FIG. 10 Shows an Example of a Pattern in which a CRS is Mapped to an RB when a BS Uses One Antenna Port.

Referring to FIG. 10, R0 denotes an RE to which a CRS transmitted using an antenna port number 0 of a BS is mapped.

An RS sequence $r_{l,ns(m)}$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1))$$ [Equation 1]

Herein, m=0, 1, . . . , $2N_{maxRB}$−1. $N_{maxRB}$ is the maximum number of RBs. ns is a slot number in a radio frame. l is an OFDM symbol index in a slot.

A pseudo-random sequence c(i) is defined by a length-31 gold sequence as follows.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 2]

Herein, Nc=1600, and a first m-sequence is initialized as $x_1(0)=1$, $x_1(n)=0$, m=1, 2, . . . , 30. A second m-sequence is initialized as $c_{init}=2^{10}(7(ns+1)+l+1)(2N^{cell}_{ID}+1)+2N^{cell}_{ID}+N^{CP}$ at a start of each OFDM symbol. $N^{cell}_{ID}$ is a physical cell identifier (PCI). $N_{CP}=1$ in a normal CP case, and $N_{CP}=0$ in an extended CP case.

The CRS is transmitted in all downlink subframes in a cell supporting PDSCH transmission. The CRS may be transmitted on antenna ports 0 to 3. The CRS may be defined only for Δf=15 kHz.

A pseudo-random sequence $r_{l,ns}(m)$ generated from a seed value based on a cell identity (ID) is subjected to resource mapping to a complex-valued modulation symbol $a^{(p)}_{k,l}$ as shown in Equation 3 below.

$$a^{(p)}_{k,l} = r_{l,n_s}(m')$$ [Equation 3]

Herein, $n_s$ denotes a slot number in one radio frame, p denotes an antenna port, and l denotes an OFDM symbol number in a slot. k denotes a subcarrier index. l and k are expressed by the following equation.

$$k = 6m + (v + v_{shift}) \bmod 6$$ [Equation 4]

$$l = \begin{cases} 0, N^{DL}_{symb} - 3 & \text{if } p \in \{0, 1\} \\ 1 & \text{if } p \in \{2, 3\} \end{cases}$$

$$m = 0, 1, \ldots, 2 \cdot N^{DL}_{RB} - 1$$

$$m' = m + N^{max,DL}_{RB} - N^{DL}_{RB}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$ [Equation 5]

In the above equation, p denotes an antenna port, and $n_s$ denotes a slot number 0 or 1.

k has 6 shifted indices according to a cell ID ($N^{Cell}_{ID}$). Accordingly, cells having cell IDs 0, 6, 12, etc., which are a multiple of 6, transmit a CRS in the same subframe position k.

In the above equation, l is determined according to the antenna port p, and a possible value for l is 0, 4, 7, 11. Accordingly, the CRS is transmitted on symbols 0, 4, 7, and 11.

A resource element (RE) allocated to a CRS of one antenna port cannot be used in transmission of another antenna port, and must be set to 0 (zero). Further, in a multicast-broadcast single frequency network (MBSFN) subframe, the CRS is transmitted only in a non-MBSFN region.

Hereinafter, MTC will be described.

Figure 11A:
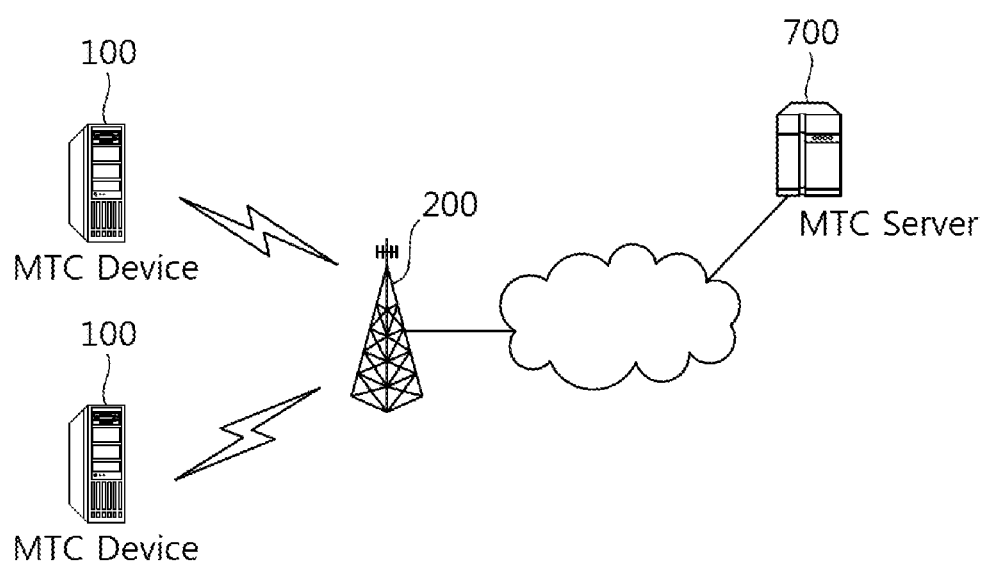
FIG. 11a illustrates an example of machine type communication (MTC).

FIG. 11a Illustrates an Example of Machine Type Communication (MTC).

The MTC refers to information exchange performed between MTC devices 100 via a BS 200 without human interactions or information exchange performed between the MTC device 100 and an MTC server 700 via the BS.

The MTC server 700 is an entity for communicating with the MTC device 100. The MTC server 700 executes an MTC application, and provides an MTC-specific service to the MTC device.

The MTC device 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC device is characterized in that a transmission data amount is small and uplink/downlink data transmission/reception occurs sometimes. Therefore, it is effective to decrease a unit cost of the MTC device and to decrease battery consumption according to a low data transmission rate. The MTC device is characterized of having a small mobility, and thus is characterized in that a channel environment does almost not change.

Figure 11B:
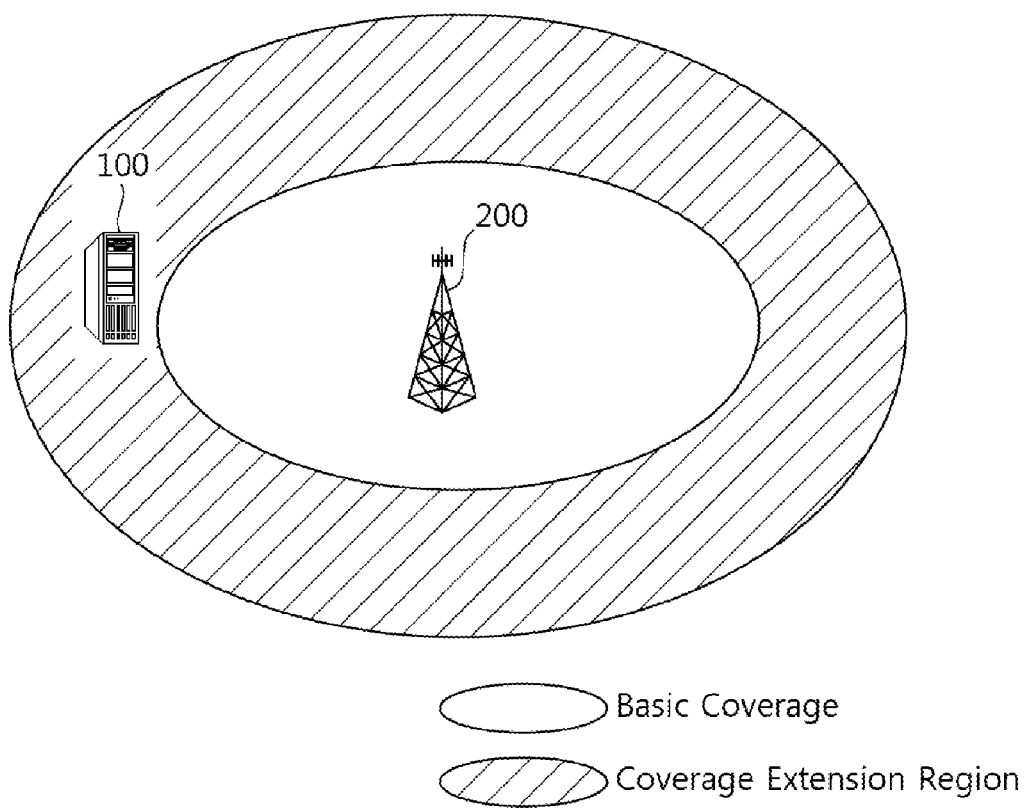
FIG. 11b illustrates an example of cell coverage extension for an MTC device.

FIG. 11b Illustrates an Example of Cell Coverage Extension for an MTC Device.

Recently, it is considered to extend cell coverage of a BS for an MTC device 100, and various schemes for extending the cell coverage are under discussion.

Meanwhile, when the MTC device 100 performs an initial access to a specific cell, the MTC device 100 receives master information block (MIB), system information block (SIB) information, and radio resource control (RRC) parameters from the cell.

However, when the cell coverage is extended, if the BS transmits a PDSCH including an SIB and a PDCCH including scheduling information for the PDSCH to the MTC device located in the coverage extension region as if it is transmitted to a normal UE, the MTC device has a difficulty in receiving the SIB.

In order to solve the aforementioned problem, the BS may repetitively transmit the PDSCH and the PDCCH to the MTC device 100 located in the coverage extension region on several subframes (e.g., bundle subframes).

On the other hand, a maximum system bandwidth supported by the normal UE is 20 MHz. However, the MTC device 100 is expected to have low performance to increase a distribution rate with a low cost, and thus the bandwidth of 20 MHz may not be fully supported. For example, in order to decrease a manufacturing unit cost, the MTC device 100 may be manufactured to support only a bandwidth of up to 1.4 MHz, 3 MHz, or 5 MHz.

A method of reducing a downlink bandwidth may be as follows.

Option 1: A bandwidth is reduced for both of an RF and a baseband.

Option 2: A bandwidth of a baseband is reduced for both of a data channel and a control channel.

Option 3: Only a bandwidth of a baseband for a data channel is reduced, and a bandwidth of a baseband for a control channel is maintained.

A method of reducing an uplink bandwidth may be as follows.

Option 1: A bandwidth is reduced for both of an RF and a baseband.

Option 2: A bandwidth is not reduced.

Among the aforementioned options, the option 2 or the option 3 may be preferably used for a downlink in order to decrease a manufacturing unit cost of the MTC device 100. However, when the bandwidth is reduced as described above, the MTC device 100 may not smoothly operate when using only a method of a legacy LTE_A system.

<Disclosures of the Present Specification>

Accordingly, disclosures of the present specification are aiming at providing a method of solving the aforementioned problems. Specifically, the disclosures of the present specification propose methods of smoothly operating the MTC device 100 when a bandwidth of a downlink data channel supported by the MTC device 100 is reduced to decrease a manufacturing unit cost. In particular, hereinafter, it is described an operation method to be performed by the MTC device on a PDCCH, a PDSCH, a physical multicast channel (PMCH), and a TDD special subframe when a bandwidth of a data channel is reduced.

<PDCCH>

First, the following description is mainly about an operation to be performed by the MTC device to receive a PDCCH when the bandwidth of the downlink data channel is reduced. Although the following description focuses on the PDCCH for convenience of explanation, the content described below is also applicable to an ePDCCH.

Figure 12:
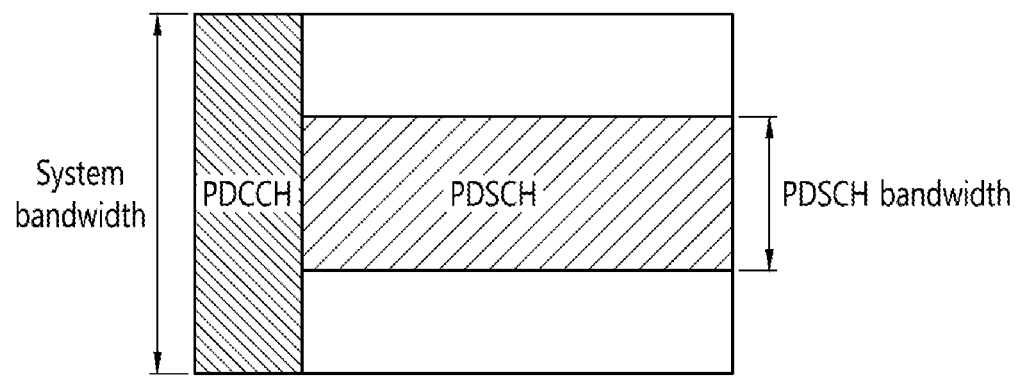
FIG. 12 illustrates an example in which a bandwidth of a data channel is reduced according to one disclosure of the present specification.

As shown in FIG. 12, a downlink control channel (i.e., PDCCH) can be transmitted through an entire system bandwidth to achieve a low-cost MTC device, whereas a bandwidth of a data channel (i.e., PDSCH) can be reduced to a smaller value than the system bandwidth. In this case, the following operation may be performed for PDCCH transmission for the low-cost MTC device.

As described above one time, a next-generation system considers a method of repetitively transmitting (i.e., bundling transmission) a channel such as a PDSCH, a PDCCH, or the like when cell coverage is extended for the MTC device. In this case, an existing channel such as a PCFICH, a PHICH, or the like may not be transmitted for the MTC device. As such, in order for the MTC device not to necessarily receive the PCFICH, the number of OFDM symbols on which the PDCCH is transmitted may be always set to 3 symbols. Alternatively, information regarding the number of OFDM symbols on which the PDCCH is transmitted may be reported to the MTC device through a PSS/SSS or through a PBCH, instead of the existing PCFICH. In addition, also in case of an MTC device which is not located in a cell coverage extension region, it is assumed that an entire system bandwidth to be assumed for data buffering is used to store resource elements across an entire band on first three OFDM symbols in a normal CP case, and is used to store resource elements for 6 PRBs or a reduced data bandwidth on the remaining OFDM symbols. In addition, when the entire band is assumed for first several OFDM symbols, information regarding the number of OFDM symbols may be signaled through a higher layer, or may be reported to the MTC device through a PBCH or the like, or may be predetermined in association with a cell ID so as to be known to the MTC device without additional signaling. In addition, when the MTC device performs a cell search, it may be unconditionally assumed that the number of OFDM symbols on which the entire system band is used is 0. Therefore, the MTC device may perform buffering only on data of a resource element for 6 PRBs.

Meanwhile, similarly to a legacy LTE-A system, the number of OFDM symbols on which the PDCCH is transmitted may dynamically change, and may be reported to the MTC device through a PCFICH. In this case, the MTC device may attempt to receive a channel or a signal through an entire system bandwidth in an OFDM symbol region in which the PDCCH is transmitted, and may attempt reception only through a reduced bandwidth of a data channel on OFDM symbols after transmission of the PDCCH ends.

Figure 13:
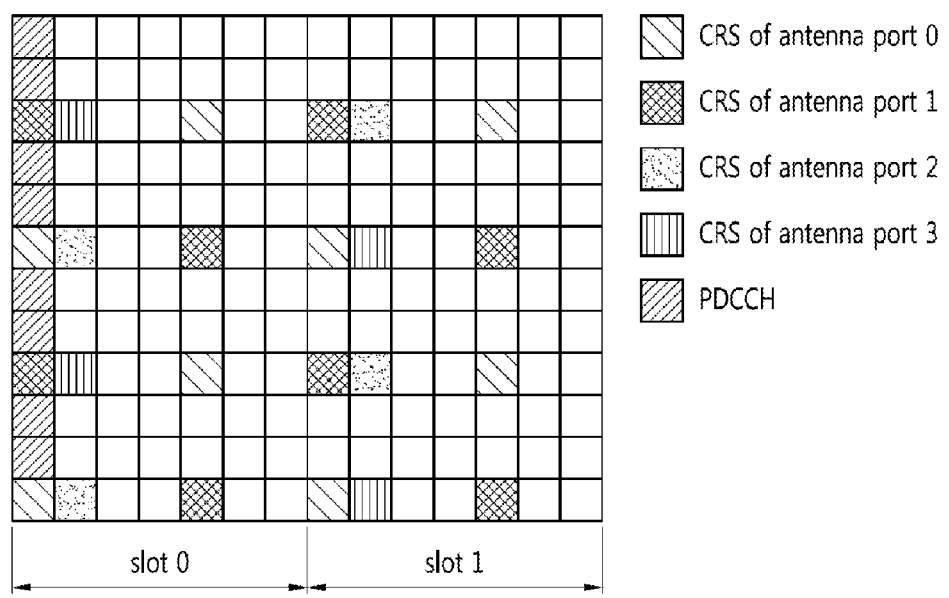
FIG. 13 illustrates an example of a CRS transmitted through 4 antenna ports according to one disclosure of the present specification.

As can be seen from FIG. 13, the MTC device needs to receive a CRS of up to 4 antenna ports in the entire system bandwidth in order to receive the PDCCH.

In this case, in order for the MTC device to receive a CRS of 4 transmission antenna ports, at least first two OFDM symbols must be received. However, for example, if the PDCCH is received only on one OFDM symbol as shown in FIG. 13, when the MTC device operates with a reduced bandwidth at which a data channel is received from a third OFDM symbol on which transmission of a PDSCH starts, the MTC device cannot receive the CRS through the 4 antenna ports in an entire system bandwidth region for receiving the PDCCH.

Therefore, the present specification proposes to regulate a reception bandwidth as follows, when it is required that an MTC device receives a control channel through an entire region of a system band and receives a data channel through a reduced bandwidth.

First, the MTC device may receive a channel/signal through an entire system bandwidth irrespective of the number of PDCCH symbols on first two OFDM symbols.

Next, the MTC device operates at an entire system bandwidth on a symbol on which a PDCCH is continuously received among symbols after the first two OFDM symbols, and operates at a reduced bandwidth of a data channel on symbols on which a PDSCH is not received.

On the other hand, downlink control information (DCI) included in the PDCCH may have several formats as described above one time. Among them, a DCI format 0 and a DCI format 1A include a resource block assignment field, and a length of the resource block assignment field is determined on the basis of a system bandwidth. A detailed description thereof is as follows.

When the MTC device receives the DCI format 0 or the DCI format 1A on the PDCCH, a length of a resource block assignment field of the DCI format 0 or the DCI format 1A is predetermined according to the following equation.

$$\lceil \log_2(N_{RB}^{DL}(N_{RB}^{DL}+1)/2) \rceil \qquad \text{[Equation 6]}$$

In the equation above, $N_{RB}^{DL}$ denotes a downlink bandwidth, and is expressed by the number of RBs.

Since $N_{RB}^{DL}$ denotes the number of RBs of a system bandwidth, the number of bits of the DCI format 1A may be set to be equal to the number of bits of the DCI format 0. In order for the number of bits of the DCI format 1A to have the same number of bits of the DCI format 0, zero padding may be performed on a DCI format having a smaller number of bits. As such, in order to make the number of bits of the DCI format 1A equal to the number of bits of the DCI format 0, the number of bits of the DCI format 1A is denoted by N_1A_long when the zero padding is performed on the DCI format 1A, and the number of bits is denoted by N_0_long when the zero padding is performed on the DCI format 0. In this case, N_1_A long and N_0_long have the same value.

However, as described above, the bandwidth of the data channel may be reduced to a value smaller than the system bandwidth. Therefore, if $N_{RB}^{DL}$ is improved to indicate the number of RBs of a bandwidth at which the data channel can be transmitted unlike the conventional method, the number of bits of the DCI format 1A and the number of bits of the DCI format 0 may not be set to be equal to each other. However, if $N_{RB}^{DL}$ is improved to indicate the number of RBs of the bandwidth at which the data channel can be transmitted as described above, a size of the resource block assignment field of the DCI format 1A may be decreased, and thus a length of the DCI format 1A for the MTC device may differ from a length of the DCI format 0. In this case, zero padding performed to compulsively make the number of bits of the DCI format 1A equal to the number of bits of the DCI format 0 may cause an overhead. When the zero padding is not performed, the number of bits of the DCI format 1A is denoted by N_1A_short, and the number of bits of the DCI format 0 is denoted by N_0_short.

Consequently, one disclosure of the present specification proposes to apply $N_{RB}^{DL}$ for determining the length of the resource block assignment field when the MTC device receives the DCI format 1A, not as the number of RBs of the bandwidth at which the data channel can be transmitted but as the number of RBs of the system bandwidth. That is, one disclosure of the present specification proposes that the MTC device assumes that the number of bits of the DCI format 1A is always equal to N_1A_long. Further, one disclosure of the present specification proposes that the MTC device assumes that the number of bits of the DCI format 0 is always equal to N_0_long.

Alternatively, in order to receive a PDCCH transmitted on a CSS, the MTC device may interpret $N_{RB}^{DL}$ not as the number of RBs of the bandwidth at which the data channel can be transmitted but as the number of RBs of the system bandwidth, and as to a PDCCH transmitted on a USS, may interpret $N_{RB}^{DL}$ as the number of RBs of the bandwidth at which the data channel can be transmitted in a downlink environment.

Alternatively, the MTC device may interpret $N_{RB}^{DL}$ not as the number of RBs of the bandwidth at which the data channel can be transmitted but as the number of RBs of the system bandwidth in a PDCCH received by using SI-RNTI (or cell-common RNTI, e.g., RA-RNTI, P-RNTI, SI-RNTI), and may interpret $N_{RB}^{DL}$ as the number of RBS of the bandwidth at which the data channel can be transmitted in a downlink environment in a PDCCH received by using C-RNTI (or different UE-specific RNTI). That is, one disclosure of the present specification proposes that the MTC device of which the bandwidth capable of receiving the data channel is reduced to a value smaller than the system bandwidth assumes that the number of bits of the DCI format 1A is equal to N_1A_long in the PDCCH received on the CSS, and the number of bits of the DCI format 1A is equal to N_1A_short in the PDCCH transmitted on the USS. Further, when the MTC device of which the bandwidth capable of receiving the data channel is reduced to the value smaller than the system bandwidth, if the PDCCH is received on the CSS, the MTC device may assume that the number of bits of the DCI format 0 is equal to N_0_long, and if the PDCCH is received on the USS, the MTC device may assume that the number of bits of the DCI format 0 is equal to N_0_short. In other words, when a BS transmits the DCI format 1A on the CSS to an MTC device located in a coverage extension region among several MTC devices, $N_{RB}^{DL}$ may be determined to denote the number of RBs of the system bandwidth, and in order to make the number of bits of the DCI format 1A equal to the number of bits of the DCI format 0, zero padding may be performed on a DCI format having a smaller number of bits so that the number of bits of the DCI format 1A is N_1A_long. Further, if the BS transmits the DCI format 0 on the CSS to the MTC device located in the coverage extension region among the several MTC devices, in order to make the number of bits of the DCI format 1A equal to the number of bits of the DCI format 0, zero padding may be performed on the DCI formats having the small number of bits so that the number of bits of the DCI format 0 is N_0_long. Further, when the BS transmits the DCI format 1A on the USS to the MTC device located in the coverage extension region, $N_{RB}^{DL}$ may denote the number of RBs of the bandwidth at which the data channel can be transmitted, and the number of bits may be determined to N_1A_short without having to perform zero padding on the DCI format 1A. Further, when the BS transmits the DCI format 0 on the USS to the MTC device located in the coverage extension region, the number of bits may be determined to N_0_short without having to perform zero padding on the DCI format 0.

Alternatively, when the DCI format 1A or other DCI formats are received through the PDCCH, the MTC device located in the coverage extension region among the several MTC devices may interpret $N_{RB}^{DL}$ as the number of RBs of the bandwidth at which the data channel can be received, and other MTC devices may interpret $N_{RB}^{DL}$ not as the number of RBs of the bandwidth at which the data channel can be received but as the number of RBs of the system bandwidth. That is, the MTC device located in the coverage extension region may assume that the number of bits of the DCI format 1A is equal to N_1A_short, and other MTC devices may assume that the number of bits of the DCI format 1A is equal to N_1A_long. Further, the MTC device located in the coverage extension region may assume that the number of bits of the DCI format 0 is equal to N_0_short, and other MTC devices may assume that the number of bits of the DCI format 0 is equal to N_0_long.

Meanwhile, when the BS transmits the DCI format 1A/0 on the USS (or CSS), $N_{RB}^{DL}$ may be determined to indicate the number of RBs of the bandwidth at which the data channel can be transmitted, and the number of bits may be maintained in different states without having to perform zero padding to make a bit length of the DCI format 0 equal to a bit length of the DCI format 1A. In this case, since the DCI format 0 and the DCI format 1A do not have the same bit length, a 'Flag for format0/format1A differentiation' field included in the existing DCI formats 0 and 1A can be removed. In this case, there may be a situation in which the DCI format 0 and the DCI format 1A have the same bit length in a specific environment. As such, in a state where the bit lengths of the format 0 and the DCI format 1A become equal to each other, if the 'Flag for format0/format1A differentiation' field is removed, a method of avoiding this is necessary since the MTC device cannot differentiate the two DCI formats. Therefore, in order to solve this problem, when the bit lengths of the DCI format 0 and the DCI format 1A become equal to each other, one embodiment proposes to perform transmission by adding the 'Flag for format0/format1A differentiation' field to the DCI format 0 and the DCI format 1A to differentiate the two DCI formats. Alternatively, when the bit lengths of the DCI format 0 and the DCI format 1A become equal to each other, one embodiment proposes to allow the two DCI formats to always have different lengths by performing 1-bit zero padding on the DCI format 1A (or DCI format 0) to differentiate the two DCI formats.

On the other hand, when the BS transmits the DCI format 1A/0 on the USS (or CSS), $N_{RB}^{DL}$ may denote the number of RBs of the bandwidth at which the data channel can be transmitted, and the number of bits may be maintained in different states without having to perform zero padding to make a bit length of the DCI format 0 equal to a bit length of the DCI format 1A. In this case, if the system bandwidth is equal to a transmission bandwidth of the MTC device, for example, if the transmission bandwidth of the MTC device is 1.4 MHz and the system bandwidth is also 1.4 MHz, the BS may transmit the DCI format 0 and the DCI format 1A by using the conventional method. That is, if the system bandwidth is equal to the transmission bandwidth of the MTC device, for example, if the transmission bandwidth of the MTC device is 1.4 MHz and the system bandwidth is also 1.4 MHz, the BS may perform zero padding on the DCI format having a shorter length so that the DCI format 0 and the DCI format 1A have the same bit length, and may perform transmission by adding a 'Flag for format0/format1A differentiation' field to the DCI format 0 and the DCI format 1A to differentiate the two DCI formats.

On the other hand, if the number of PRBs or the bandwidth at which the data channel can be transmitted is expressed by PDSCH_RB, in order to decrease the length of the DCI format, a low-cost MTC device may interpret $N_{RB}^{DL}$ of the resource block assignment field of the DCI format as PDSCH_RB. As such, if $N_{RB}^{DL}$ of the resource block assignment field is interpreted as PDSCH_RB and thus the length of the DCI format 1A is decreased, the number of blind decoding attempts for differentiating the DCI formats 0 and 1A is increased in both of the CSS and the USS. In order not to increase the number of blind decoding attempts for receiving DCI in the USS in such an environment, one embodiment proposes not to receive DCI formats other than the DCI format 1A, among the DCI formats for a downlink grant in the USS.

Alternatively, in order not to increase the number of blind decoding attempts, another embodiment proposes that the MTC device interprets $N_{RB}^{DL}$ of the resource block assignment field to PDSCH_RB only for the DCI formats other than the DCI format 1A, among the DCI formats for the downlink grant. That is, it is proposed that the low-cost MTC device receives DCI by interpreting $N_{RB}^{DL}$ as a system bandwidth as to the DCI format 1A among the DCI formats for the downlink grant, and receives the DCI by interpreting $N_{RB}^{DL}$ as the number of PRBs (PDSCH_RB) on which the data channel can be received as to the remaining DCI formats.

<Cell-Specific PDSCH>

Next, the following description focuses on an operation to be taken by an MTC device to receive a PDSCH when a bandwidth of a downlink data channel is reduced.

When the MTC device must receive a cell-common PDSCH, the MTC device first searches for a downlink grant through a common search space (CSS) region of a PDCCH. In this case, cell-specific data (e.g., SIB) to be transmitted by a BS to the MTC device may be different in content from cell-specific data to be transmitted by the BS to a legacy UE. In addition, even if MTC devices have the same type, cell-specific data required for an MTC device located in a coverage extension region may be different in content from cell-specific data required for an MTC device located in a region other than the coverage extension region.

For this, one disclosure of the present specification proposes to differentiate a CSS region for the MTC device from a CSS region for the legacy UE. Herein, the CSS region may be an RE resource, PRB resource, and/or subframe region, or the like of the CSS. Further, one disclosure of the present specification proposes to differentiate the CSS region for the MTC device located in the coverage extension region from a CSS region for other MTC devices.

In this case, system information RNTI (SI-RNTI) for MTC devices may be created separately from SI-RNTI for the legacy UE, so as to be used as RNTI for transmitting an SIB for the MTC device or a cell-specific signal. Additionally, SI-RNTI for the MTC device located in the coverage extension region may be separately used to transmit the SIB or the cell-specific signal.

A CSS region to be used by the MTC device may be delivered to the MTC device from the BS through a master information block (MIB) or the SIB. Alternatively, since a region in which a cell-specific PDSCH for the MTC device is transmitted is predetermined, the MTC device may not expect to receive the PDCCH on the CSS.

Unlike a case where the legacy UE acquires information on a PRB region in which a cell-specific PDSCH is received through a downlink grant received on a CSS, a PRB region capable of receiving a cell-specific PDSCH for an MTC device in which only a bandwidth capable of transmitting a data channel is reduced may be fixed to center 6 RBs. Alternatively, an RB region capable of transmitting the cell-specific PDSCH for the MTC device may be delivered to the MTC device via the BS through the MIB or the SIB or the like.

Further, in another method, it may be considered that the cell-specific PDSCH is shared between a normal MTC device and a low-cost MTC device located in the coverage extension region and a low-cost MTC device located in a region other than the coverage extension region. In case of the low-cost MTC device, it may be assumed that the PDSCH is received on predetermined 6 PRBs, and an SIB included in the PDSCH may not be decoded only with the PDSCH received one time. Therefore, the MTC device may read the PDSCH by a predetermined repetition number to decode one SIB. For example, if the repetition number is set to 4 in a situation where a first type SIB is received on subframes #5 and #25, the low-cost MTC device must read the PDSCH four times on subframes #5, #25, #45, and #65 to decode the first type SIB. If the SIB is not received on the subframe, decoding is attempted by reading the SIB by the predetermined repetition number in such a manner that the SIB is read on a next subframe. Alternatively, the first type SIB may be read by continuously performing decoding. If a bandwidth of the PDSCH exceeds 6 PRBs allocated to the MTC device, the BS may assume that the PDSCH for the MTC device is punctured on a PRB when exceeding the 6 PRBs, and by considering this, may allocate a next resource of a PDSCH including an SIB.

Further, in another method, in order for the MTC device not to monitor a CSS PDSCH, the BS may report this to the MTC device through a higher layer signal or may report this to the MTC device through an MIB or the like, or may predetermine this for the MTC device. In this case, in order for the MTC device to read information such as the SIB or the like, the MIB may include necessary configuration information, and information regarding RNTI or the like which has to read the SIB may be included in the MIB. Herein, one embodiment may consider a method in which an SIB can be transmitted without a PDCCH similarly to a PBCH including an MIB. Furthermore, an RNTI may be used separately for the MTC device located in the coverage extension region and the MTC device located in the region other than the coverage extension region, and if each RNTI is reported to the MTC device through the MIB or each PBCH is transmitted separately, it may be assumed that the RNTI is configured according to a feature of the PBCH to be read. For example, when the PBCH is transmitted for the low-cost MTC device, an included RNTI may be used to read a CSS PDSCH or SIB of the low-cost MTC device, and when the PBCH is transmitted to the MTC device located in the coverage extension region, the included RNTI may be used in SIB transmission of the MTC device. In this case, the RNTI may be considered as a USS. In this case, in order to decrease the number of RNTIs on which each MTC device must perform blind decoding, the RNTI which must be read for each subframe for each MTC device may be reported to the MTC device through a higher layer signal, or may be predetermined. For example, the MTC device may decode an SIB or a CSS PDSCH on subframes #0 and #5 by using a dedicated RNTI, and may decode the SIB or the CSS PDSCH on other subframes by using a normal RNTI. For this, a BS of a corresponding cell may report a subframe in which the MTC device reads the CSS PDSCH or the SIB to the MTC device in a form of a bitmap, or may report this in a form of a period/offset. Alternatively, on the contrary, the BS of the cell may report a subframe for reading the USS PDSCH.

<UE-Specific PDSCH>

Next, the following description focuses on an operation to be taken by an MTC device to receive a UE-specific PDSCH when a bandwidth of a downlink data channel is reduced.

(1) Frequency Location of PDSCH

First, when a bandwidth capable of receiving a data channel for a low-cost MTC device is reduced, a frequency location for the data channel for the MTC device may be: 1) fixed; 2) changed depending on a predetermine pattern; 3) semi-statically configured; or 4) dynamically configured. Meanwhile, for an MTC device located in a coverage extension region, a BS of a corresponding cell may repetitively transmit a bundle of identical PDSCHs on several subframes. In this case, when a frequency (or RB region) at which a PDSCH is located is changed during a subframe duration in which the PDSCH is repeated, a performance improvement effect may be decreased.

Therefore, one embodiment of the present specification maintains the frequency location of the PDSCH, i.e., RB location, without alternation during the subframe duration in which the bundle of identical PDSCHs is transmitted. This will be described for example below with reference to FIG. 14.

Figure 14:
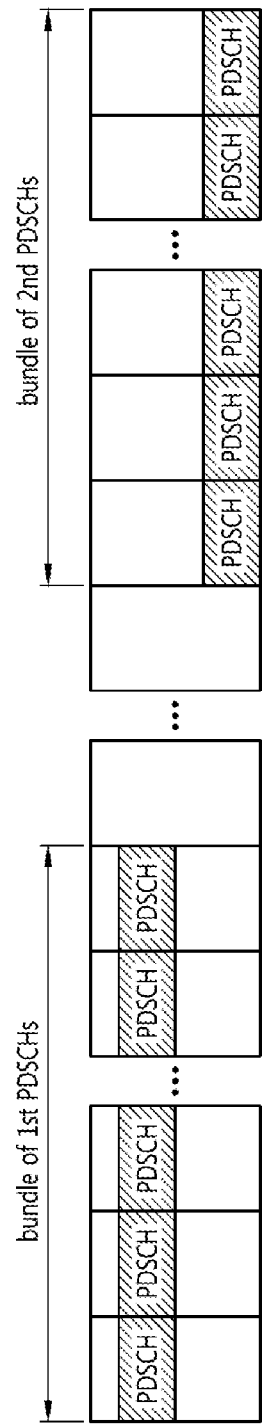
FIG. 14 illustrates an example of a frequency location of a bundle of physical downlink shared channels (PDSCHs).

For example, as shown in FIG. 14, the frequency location of the PDSCH may be maintained without alteration during a duration of subframes in which a bundle of first PDSCHs is transmitted. For example, in a first subframe in which transmission of a PDSCH bundle starts, a frequency location of the PDSCH bundle may be maintained until transmission of the PDSCH bundle ends. Therefore, an MTC device may assume that a frequency location of a first subframe is continuously maintained during the same PDSCH bundle is received. However, when a second PDSCH bundle is transmitted, it may be transmitted on a frequency location different from that first PDSCH bundle.

(2) Channel State Information (CSI) Report

On the other hand, in general, in order to report a downlink channel state, a UE performs a CSI report periodically or aperiodically. In general, CSI may roughly include three types of information, such as a rank indicator (RI), a precoding matrix index (PMI), and a channel quality indication (CQI).

However, if a bandwidth of a data channel of a low-cost MTC device is reduced, the MTC device may receive not only the data channel but also another channel and a reference signal only in the reduced bandwidth region. In this case, information included in the CSI report may not be sufficient. Therefore, an operation of the MTC device may need to be changed as to the CSI report. Hereinafter, a periodic CSI report and an aperiodic CSI report will be described separately.

a) Periodic CSI Report

First, when an MTC device of which a bandwidth of a data channel is reduced performs the periodic CSI report, the MTC device must know which type of a CQI feedback (e.g., a wideband CQI, a sub-band CQI) will be performed for the CQI report. In this case, the followings may be considered as a CQI feedback method that can be used by the MTC device. Although the following description is about the CQI, the same may also be applied not only to the CQI but also to a feedback for other information such as RI, PMI, etc.

In case of the wideband CQI, the MTC device may report a wideband CQI not for a reduced bandwidth of the data channel but for an entire system bandwidth. The MTC device may measure the CQI by using CSI-RS, CRS, or the like received by the MTC device when performing the CQI feedback, and may perform a feedback for this. Simply, even if the MTC device fails to receive the CSI-RS on all RBs of the system bandwidth but receives the CSI-RS only on some RBs, the MTC device may estimate the CQI by using only the CSI-RS received on only the some RBs, and may regard this as a wideband CQI. Specifically, the MTC device may estimate the CQI by using only the reduced bandwidth of the data channel, and may feed back a CQI for the reduced bandwidth as the wideband CQI. Alternatively, since the MTC device receives a PDCCH on the entire system bandwidth as described above, a CRS received together during receiving the PDCCH may be used to measure a CQI for the entire system bandwidth and the CQI may be fed back. Alternatively, the MTC device may measure a CQI in the data channel and feed back the CQI by regarding a wideband as the bandwidth of the data channel.

In case of the sub-band CQI, a CQI for a sub-band may be fed back among bandwidths capable of receiving data in a duration in which a measurement must be performed for a CQI feedback. For example, this will be described below with reference to FIG. 15.

Figure 15:
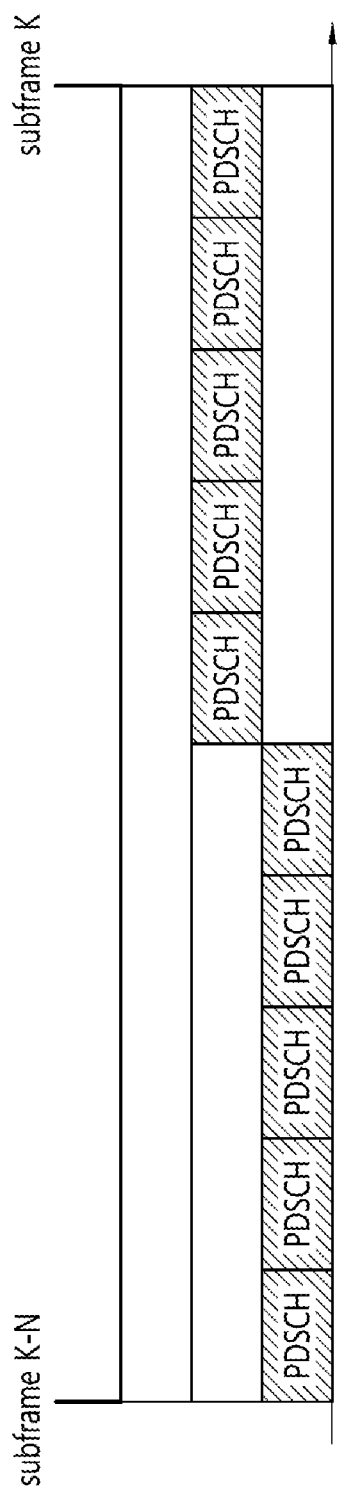
FIG. 15 illustrates an example of subframes in which a sub-band channel quality indicator (CQI) measurement is performed.

As can be seen from FIG. 15, if a CQI feedback is performed on a subframe K for example, when a measurement is performed on previous N subframes from the subframe K, a CQI may be measured for some or all sub-bands among bandwidths capable of receiving data. In this case, N may be the same value as a subframe for the CQI feedback. The sub-band may be M sub-bands exhibiting the best performance. That is, as shown in FIG. 15, during first several subframes, when a PDSCH is received on a bandwidth located at a lower portion on a frequency axis, a CQI for sub-bands constituting a bandwidth located at the lower portion is measured, and when the PDSCH is received at a later time on a bandwidth located at a center portion on the frequency axis, a CQI for sub-bands constituting a bandwidth located at the center portion is measured. Among the CQI measurement results, the MTC device may feed back information on CQI values for the M sub-bands exhibiting the best performance and information on the M values. The M sub-bands may be constructed of, for example, 6 RBs. In other words, a CQI may be measured for a band capable of performing reception during the N subframes (i.e., a band located at a front lower position + a band located at a rear middle position), and thereafter a CQI for the M sub-bands exhibiting the best performance may be fed back. In this case, a size of each sub-band may be, for example, 6 PRBs. That is, for example, when a PDSCH is received by using PRBs 0 to 5 during several subframes and thereafter the PDSCH is received again by using PRBs 6 to 11 during several subframes, if a size of a sub-band is 3, a CQI for four sub-bands is measured for the PRBs 0 to 11, and a CQI for the M sub-bands exhibiting the best performance is fed back. For another example, if the size of the sub-band is 6, a CQI for two sub-bands is measured for PRBs 0 to 11, and a CQI for the M sub-bands exhibiting the best performance is fed back. When the CQI is fed back, a CQI value for the M sub-bands exhibiting the best performance and an index of the sub-band may be delivered together.

Alternatively, the MTC device may measure a CQI for a specific sub-band by using a CRS received together during receiving a PDCCH in an entire system bandwidth, and may perform a feedback for this.

Alternatively, when the MTC device receives a data channel transmitted from a BS on a reduced bandwidth, a CQI for a sub-band in which a corresponding reference signal is located may be measured by using reference signals (e.g., CRS, CSI-RS) at a band other than the deduced bandwidth, and this may be additionally or independently fed back to the BS.

Figure 16:
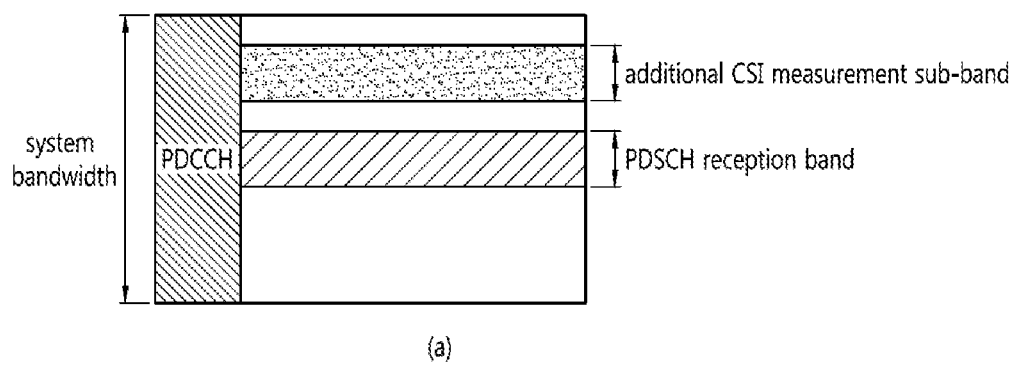
FIG. 16 shows an example of a region in which a sub-band CQI measurement is performed.
Figure 16:
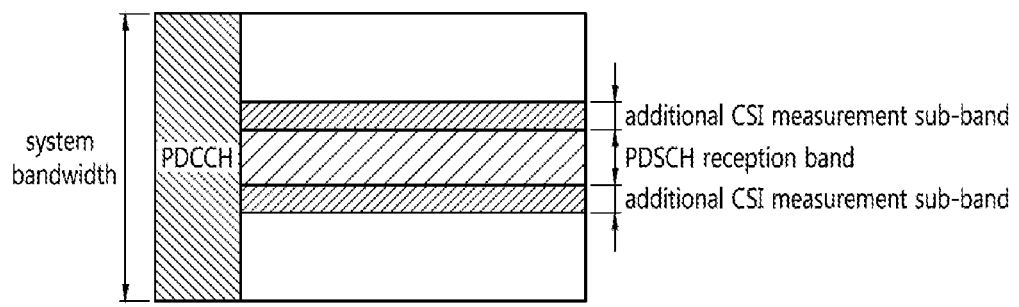

This will be described below with reference to FIG. 16.

As shown in FIG. 16(a), the MTC device may receive a reference signal (RS) in an additional CSI measurement sub-band, and thus may feed back CQI information on the sub-band additionally or independently to the BS. For this, the BS may deliver information on the additional CSI measurement sub-band to the MTC device through an RRC or a PDCCH or the like. The information on the additional CSI measurement sub-band may be expressed as a coordinate location of an RB. Alternatively, the information may be expressed as an offset or location gap from a PDSCH reception band.

Alternatively, a sub-band in which the MTC device will additionally perform a CQI measurement may be determined randomly or autonomously by the MTC device. In this case, when the MTC device feeds back a CQI for an additionally measured sub-band region to the BS, location information of the sub-band in which the CQI is measured, for example, sub-band index information, may be delivered together.

Meanwhile, as shown in FIG. 16(b), the additional CSI measurement sub-band may be adjacent to both sides or one side of the PDSCH reception band. For example, when an RB #x to an RB #x+a are assigned as a PDSCH band, the MTC device may always measure a CQI for a region of an RB #x−M to an RB #x+a+M and may feed back the CQI to the BS.

b) Aperiodic CSI Report

In order to perform an aperiodic CSI report to a BS, an MTC device of which a bandwidth of a data channel is reduced must receive an instruction for reporting an aperiodic CSI through a CSI request field in a PDCCH (including an uplink grant). At present, the CSI request field consists of 1 bit or 2 bits. In this case, according to one embodiment of the present invention, the CQI request field for the MTC device may always consist of 1 bit. Meanwhile, the BS may report or predetermine a sub-band in which a measurement will be performed for the CSI report to the MTC device in advance through a higher layer signal, or may deliver the sub-band by including it into the aperiodic CSI request. Then, the MTC device may perform a measurement by using a CRS or CSI-RS received on a corresponding sub-band. From a time aspect, if the PDCCH including the CSI request field is received on a subframe A, the MTC device performs a measurement on the subframe A. However, on the subframe for receiving the PDCCH including the CSI request field, a sub-band configured to perform the measurement is not included in the reduced bandwidth of the data channel received by the MTC device, and thus there may be a case where the measurement cannot be performed on the configured sub-band. In order to avoid such a problem, the subframe on which the measurement is performed may be separated by k from the subframe A on which the PDCCH including the CSI request field is received. That is, the subframe on which the measurement is performed may be determined to A+k.

Meanwhile, in the aforementioned periodic CSI report, the description on the wideband CQI and the sub-band CQI may also be directly applied to the aperiodic CSI report.

<PMCH (Physical Multicast CHannel)>

Meanwhile, the following description focuses on an operation to be taken by an MTC device to receive a PMCH when a bandwidth of a downlink data channel is reduced.

The MTC device has a delay tolerant characteristic, and is optimized for not frequent data reception. Further, since a bandwidth of a data channel is reduced in comparison with a system bandwidth for a low cost, the MTC device may not be able to receive a PMCH. Therefore, according to one disclosure, the MTC device may not expect to receive the PMCH in an MBSFN subframe. More specifically, the MTC device may not expect to receive all data and control channels expect for an uplink grant in the MBSFN subframe. Alternatively, the MTC device may not expect to receive all of the data and control channels in the MBSFN subframe. More specifically, when the MTC device cannot support a transmission mode 9 (TM9) and/or a transmission mode 10 (TM10), reception of all of the data and control channels may not be expected in the MBSFN subframe, or reception of the control channels and the data channels except for the uplink grant may not be expected. For this, capability signaling may be performed on a BS to inform whether the MTC device supports the TM9 and/or the TM10. More specifically, if the TM9 and/or the TM10 cannot be supported, the MTC device may perform signaling on the BS separately from performance regarding whether a CSI-RS can be received or not. Alternatively, even if the TM9 and/or the TM10 cannot be supported, the MTC device may perform signaling so that the CSI-RS can be received.

<Operation in Special Subframe of TDD>

Meanwhile, the following description focuses on an operation to be taken by an MTC device in a special subframe of TDD when a bandwidth of a downlink data channel is reduced.

The number of OFDM symbols to be received by the MTC device on a specific subframe varies depending on a configuration of the special subframe. In case of an MTC device for receiving a data channel on a reduced bandwidth in comparison with a legacy UE, although data for all REs cannot be stored in a normal downlink subframe, there may be a case where the data for all REs can be stored on the special subframe.

Accordingly, it is proposed that the MTC device for receiving the data channel on the reduced bandwidth attempts to perform reception at an entire system bandwidth as to all OFDM symbols during DwPTS on special subframes which are set to special subframe configurations 0 and 5. In this case, the BS may transmit a CSI-RS or the like on the entire bandwidth during DwPTS, so that the MTC device can perform a CSI measurement on the entire bandwidth during DwPTS.

The aforementioned embodiments of the present invention can be implemented through various means. For example, the embodiments of the present invention can be implemented in hardware, firmware, software, combination of them, etc. Details thereof will be described with reference to the drawing.

Figure 17:
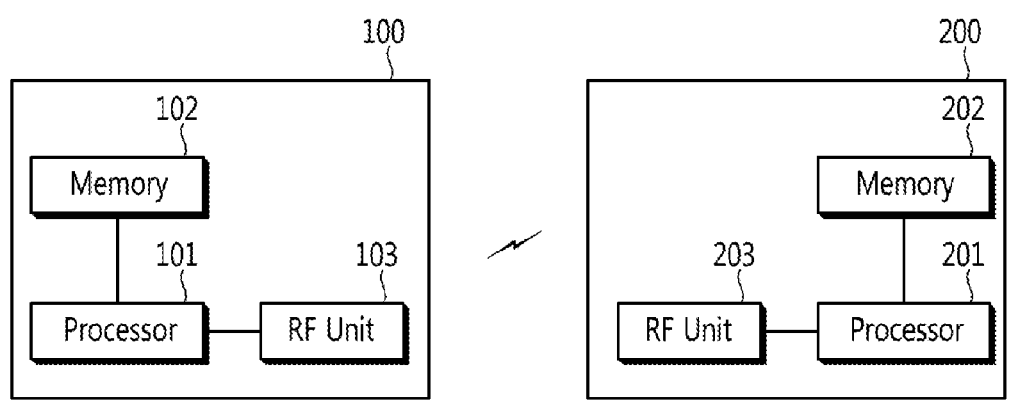
FIG. 17 is a block diagram illustrating a wireless communication system according to one disclosure of the present specification.

FIG. 17 is a Block Diagram Illustrating a Wireless Communication System According to One Disclosure of the Present Specification.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving a downlink data channel, the method being performed by a low-cost/low-capability (LC) device, the method comprising:
    receiving a downlink control information (DCI), which is repeated on a first plurality of downlink subframes, the DCI including a resource block assignment (RA) field including an $N_{RB}^{DL}$ parameter;
    interpreting the RA field in the DCI, the interpretation being performed in consideration that the $N_{RB}^{DL}$ parameter indicates a reduced bandwidth for the LC device as a number of one or more resource blocks (RBs), the reduced bandwidth for the LC device being located within a downlink system bandwidth of a cell; and
    receiving a downlink data channel, which is repeated on a second plurality of downlink subframes, on the one or more RBs identified by the interpreted RA field.

2. The method of claim 1, wherein a location of the one or more RBs on which the downlink data channel is received is configured.

3. The method of claim 1, wherein a location of the at least one or more RBs on which the downlink data channel is received is dynamically changeable.

4. The method of claim 1, further comprising transmitting a channel quality indication (CQI) with respect to the reduced bandwidth for the LC device.

5. The method of claim 1, wherein the reduced bandwidth for the LC device includes 6 RBs.

6. The method of claim 1, further comprising acquiring information on a number of repetitions of the downlink data channel.

7. The method of claim 1, wherein the downlink data channel includes a system information block (SIB).

8. The method of claim 7, wherein the SIB includes information dedicated for the LC device.

9. A low-cost/low-capability (LC) device for receiving a downlink data channel, the LC device comprising:
    a transceiving unit; and
    a processor operatively connected to the transceiving unit and configured to:
        receive a downlink control information (DCI), which is repeated on a first plurality of downlink subframes, the DCI including a resource block assignment (RA) field including an $N_{RB}^{DL}$ parameter;
        interpret the RA field in the DCI, the interpretation being performed in consideration that the $N_{RB}^{DL}$ parameter indicates a reduced bandwidth for the LC device as a number of one or more resource blocks (RBs), the reduced bandwidth for the LC device being located within a downlink system bandwidth of a cell; and
        receive a downlink data channel, which is repeated on a second plurality of downlink subframes, on one or more RBs identified by the interpreted RA field.

10. The LC device of claim 9, wherein a location of the one or more RBs on which the downlink data channel is received is configured.

11. The LC device of claim 9, wherein a location of the one or more RBs on which the downlink data channel is received is dynamically changeable.

12. The LC device of claim 9, wherein the processor is further configured to transmit a channel quality indication (CQI) with respect to the reduced bandwidth for the LC device.

13. The LC device of claim 9, wherein the reduced bandwidth for the LC device includes 6 RBs.

14. The LC device of claim 9, wherein the processor is further configured to acquiring information on a number of repetitions of the downlink data channel.

15. The LC device of claim 9, wherein the downlink data channel includes a system information block (SIB).

16. The LC device of claim 15, wherein the SIB includes information dedicated for the LC device.

* * * * *